United States Patent
Djukic et al.

(10) Patent No.: US 10,595,218 B2
(45) Date of Patent: Mar. 17, 2020

(54) HARQ FRAME DATA STRUCTURE AND METHOD OF TRANSMITTING AND RECEIVING WITH HARQ IN SYSTEMS USING BLIND DETECTION

(71) Applicant: Huawei Technologies Co., Ltd., Shenzhen (CN)

(72) Inventors: Petar Djukic, Nepean (CA); Hosein Nikopour, San Jose, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/273,535

(22) Filed: Feb. 12, 2019

(65) Prior Publication Data

US 2019/0174335 A1 Jun. 6, 2019

Related U.S. Application Data

(63) Continuation of application No. 15/180,227, filed on Jun. 13, 2016, now Pat. No. 10,212,613, which is a
(Continued)

(51) Int. Cl.
*H04W 24/02* (2009.01)
*H04L 1/18* (2006.01)
(Continued)

(52) U.S. Cl.
CPC .......... *H04W 24/02* (2013.01); *H04L 1/007* (2013.01); *H04L 1/008* (2013.01); *H04L 1/0038* (2013.01);
(Continued)

(58) Field of Classification Search
CPC ..... H04W 24/02; H04W 88/02; H04W 88/08; H04L 1/0038; H04L 1/0041;
(Continued)

(56) References Cited

U.S. PATENT DOCUMENTS 5,333,135 A * 7/1994 Wendorf ............ H04Q 11/0478
370/394
6,658,381 B1 * 12/2003 Hellwig ................ H04J 3/0605
340/7.34
(Continued)

FOREIGN PATENT DOCUMENTS

CN 1592244 A 3/2005
CN 102265677 A 11/2011
(Continued)

OTHER PUBLICATIONS

Moosavi, R. et al., "A Fast Scheme for Blind Indentification of Channel Codes," 54th IEEE Global Communications Conference (GLOBECOM), 2011, 6 pages.
(Continued)

*Primary Examiner* — John J Tabone, Jr.
(74) *Attorney, Agent, or Firm* — Slater Matsil, LLP

(57) ABSTRACT

A HARQ frame data structure and methods of transmitting and receiving with HARQ in systems using blind detection. In one embodiment, a method of transmitting over a channel using HARQ includes transmitting a first frame containing data toward a blind detection receiver, and transmitting a second frame containing at least a portion of the data and information about the first frame toward the blind detection receiver.

20 Claims, 9 Drawing Sheets

Related U.S. Application Data continuation of application No. 14/183,219, filed on Feb. 18, 2014, now Pat. No. 9,369,241.

(51) Int. Cl.
| | |
|---|---|
| *H04L 1/08* | (2006.01) |
| *H04L 1/00* | (2006.01) |
| *H04L 5/00* | (2006.01) |
| *H04W 88/02* | (2009.01) |
| *H04W 88/08* | (2009.01) |

(52) U.S. Cl.
CPC .......... *H04L 1/0041* (2013.01); *H04L 1/0061* (2013.01); *H04L 1/0072* (2013.01); *H04L 1/08* (2013.01); *H04L 1/188* (2013.01); *H04L 1/1812* (2013.01); *H04L 1/1845* (2013.01); *H04L 1/1896* (2013.01); *H04L 5/0055* (2013.01); *H04W 88/02* (2013.01); *H04W 88/08* (2013.01)

(58) Field of Classification Search
CPC ..... H04L 1/0061; H04L 1/007; H04L 1/0072; H04L 1/008; H04L 1/08; H04L 1/1812; H04L 1/1845; H04L 1/188; H04L 1/1896; H04L 5/0055
USPC ......... 714/748, 712, 749; 370/392, 394, 474
See application file for complete search history.

(56) References Cited

U.S. PATENT DOCUMENTS

| | | | | |
|---|---|---|---|---|
| 6,741,581 | B1* | 5/2004 | Sun | H04L 1/1812 370/338 |
| 7,088,701 | B1* | 8/2006 | Attar | H04L 1/0001 370/347 |
| 8,416,749 | B2* | 4/2013 | Bui | H04L 5/0007 370/336 |
| 8,625,601 | B2* | 1/2014 | Gholmieh | H04W 72/042 370/394 |
| 9,369,241 | B2* | 6/2016 | Djukic | H04L 1/0061 |
| 9,788,342 | B2* | 10/2017 | Lee | H04J 11/00 |
| 10,212,613 | B2* | 2/2019 | Djukic | H04L 1/0038 |
| 2007/0058595 | A1 | 3/2007 | Classon et al. | |
| 2007/0266292 | A1 | 11/2007 | Korndewal et al. | |
| 2008/0056229 | A1* | 3/2008 | Gholmieh | H04W 72/042 370/349 |
| 2008/0212514 | A1 | 9/2008 | Chen | |
| 2010/0273506 | A1 | 10/2010 | Stern-Berkowitz et al. | |
| 2011/0038302 | A1* | 2/2011 | Papasakellariou | H04L 5/0007 370/315 |
| 2011/0103290 | A1 | 5/2011 | Suzuki et al. | |
| 2013/0343311 | A1 | 12/2013 | Tee et al. | |
| 2014/0016598 | A1 | 1/2014 | Kwon et al. | |
| 2014/0169412 | A1 | 6/2014 | Baligh et al. | |
| 2014/0192767 | A1* | 7/2014 | Au | H04W 74/0866 370/330 |
| 2014/0254455 | A1* | 9/2014 | Nikopour | H04W 72/0466 370/312 |
| 2014/0254544 | A1 | 9/2014 | Kar Kin Au et al. | |
| 2015/0181406 | A1 | 6/2015 | Seo et al. | |
| 2015/0195069 | A1* | 7/2015 | Yi | H04W 4/70 370/329 |
| 2015/0245350 | A1 | 8/2015 | Webb et al. | |
| 2016/0007374 | A1* | 1/2016 | Lee | H04J 11/00 370/336 |
| 2016/0286416 | A1* | 9/2016 | Djukic | H04L 1/007 |
| 2017/0026996 | A1 | 1/2017 | Wengerter | |
| 2019/0174335 | A1* | 6/2019 | Djukic | H04L 1/007 |

FOREIGN PATENT DOCUMENTS

| | | |
|---|---|---|
| EP | 2178239 A2 | 4/2010 |
| JP | 4517430 B2 | 8/2010 |
| RU | 2010132856 A | 2/2012 |
| WO | 2008086517 A1 | 7/2008 |
| WO | 2009102667 A1 | 8/2009 |
| WO | 2014021632 A1 | 2/2014 |

OTHER PUBLICATIONS

NSN, "Considerations on E-DPCCH Overhead Reduction," 3G99 TSG RAN WG1, Meeting #74, R1-133739, Aug. 2013, 8 Pages, Barcelona, Spain.

Panasonic, "PDCCH Signaling for Retransmission of Downlink Persistent Scheduling," Source: Panasonic, Agenda Item: 6.1.3, Document for: Discussion and Decision, 3GPP TSG RAN WG1 Meeting #51bis, Sevilla, Spain, Jan. 14-18, 2008, R1-080134, 3 pages.

Srinivasan, R., et al., "IEEE 802.16m System Descrisption Document (SDD)", IEEE 802.16M/09/0034, Jul. 2009, 161 Pages.

* cited by examiner

HARQ FRAME DATA STRUCTURE AND METHOD OF TRANSMITTING AND RECEIVING WITH HARQ IN SYSTEMS USING BLIND DETECTION

This application is a continuation of U.S. patent application Ser. No. 15/180,227, filed Jun. 13, 2016, titled, "HARQ Frame Data Structure and Method of Transmitting and Receiving with HARQ in Systems Using Blind Detection," which is a continuation of U.S. patent application Ser. No. 14/183,219 (U.S. Pat. No. 9,369,241), filed Feb. 18, 2014, titled "HARQ Frame Data Structure and Method of Transmitting and Receiving with HARQ in Systems Using Blind Detection," which applications are incorporated herein by reference.

TECHNICAL FIELD

The present invention relates generally to a hybrid automatic repeat request (HARQ) frame data structure and methods for transmitting and receiving with HARQ and blind detection and, in particular embodiments, to a network interface controller (NIC) and methods for transmitting and receiving over a channel using HARQ.

BACKGROUND

Many communication systems utilize blind detection to reduce overhead. Without blind detection, a communication system uses additional signaling to setup and coordinate transmissions. With blind detection, no additional signaling is necessary to setup a transmission of a frame or to indicate properties of the transmission to a receiver, such as the type of modulation and coding used in the transmission. The systems may employ a setup of generic transmission properties before any frame is transmitted. Blind detection receivers often feature powerful computation capabilities sufficient to try multiple possibilities for the properties of a transmission when detecting and decoding.

Many communication systems, particularly wireless systems, use some form of retransmissions to enhance performance, referred to as HARQ. In a first transmission, a transmitter transmits encoded bits of data toward a receiver. Ideally, the receiver is able to detect and decode the transmission and typically sends an acknowledgment of receipt to the transmitter. When the receiver is unable to detect and decode a transmission, in HARQ systems, the transmitter re-transmits at least a portion of the encoded bits. The receiver then combines the re-transmission and the first transmission for decoding. Combining two or more transmissions can be achieved by a variety of techniques, including chase combining or incremental redundancy, among others.

Blind detection and HARQ are examples of techniques that allow certain communication systems to improve system performance and efficiency.

SUMMARY OF THE INVENTION

Embodiments of the present invention provide methods of transmitting and receiving using HARQ in systems using blind detection, and a NIC employing a HARQ frame data structure.

In one embodiment, a method of transmitting over a channel using HARQ includes transmitting a first frame containing data toward a receiver using a blind detection protocol, and transmitting a second frame containing at least a portion of the data and information about the first frame toward the receiver using the blind detection protocol.

In another embodiment, a method of receiving over a channel using HARQ includes detecting and attempting to decode a first frame containing data using blind detection, detecting a second frame containing at least a portion of the data and information about the first frame using blind detection, decoding and employing the information about the first frame in associating and combining the first frame and the at least a portion of the data into a combined frame, and decoding the combined frame.

In yet another embodiment, a NIC includes a memory configured to store a HARQ frame data structure. A HARQ frame data structure includes a data field for encoded data bits and a header field for information about a first frame. The NIC also includes a processor coupled to the memory and a transmitter, and is configured to compute a cyclic redundancy check (CRC) for the data field. Additionally, the processor is configured to cause the transmitter to transmit the first frame containing the data field and the CRC. The processor is further configured to populate the header field, compute at least one CRC for the data field and the header field, and cause the transmitter to transmit a second frame containing the data field, the header field, and the at least one CRC.

In yet another embodiment, a NIC includes a blind detection receiver configured to receive a first frame and a second frame. The first frame includes at least a data field. The second frame includes a header and at least a portion of the data field from the first frame. The NIC also includes a processor and a decoder configured to attempt to decode the first frame and decode the header of the second frame. The header includes information about the first frame. The processor is configured to employ the information about the first frame to associate the first frame and the second frame and combine the portion of the data field and the first frame into a combined frame.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
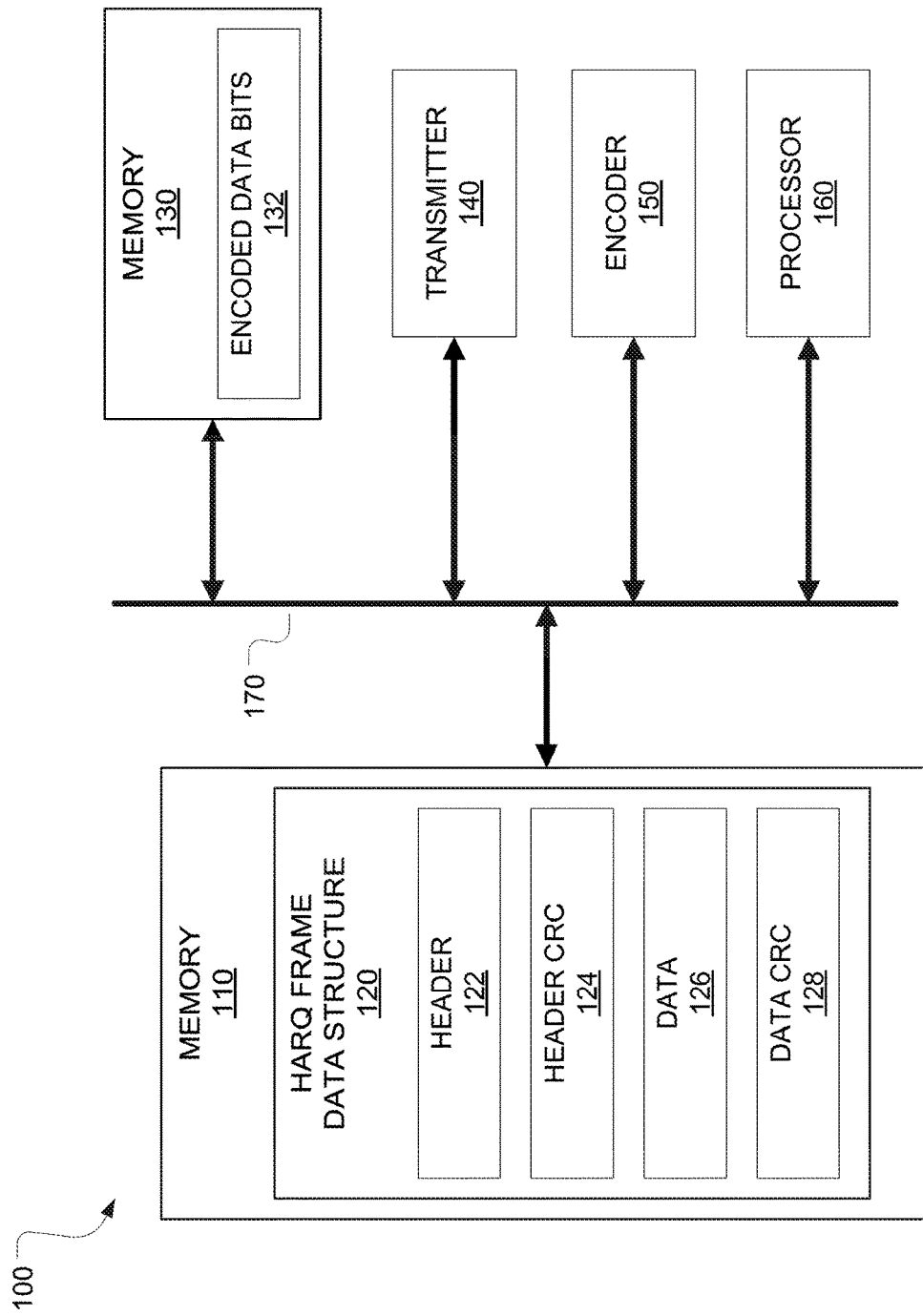
FIG. 1 is a block diagram of one embodiment of a NIC.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

Communication systems divide channels into resource units (RUs) that represent diversity among time, frequency, space, coding, pilot sequence, or other property of a signal that distinguishes it from another, or any combination of those properties. A user equipment (UE) is assigned one or more RUs for carrying out communication. When a system has fewer UEs than RUs, the system may use hard assignments of RUs to respective UEs. With hard assignment, an RU is assigned to a single UE, and therefore knowledge of an RU for a given signal is effectively knowledge of the origin UE. When a system has more UEs than RUs, the system uses soft assignments of RUs, which means an RU can be assigned to multiple UEs. With soft assignment, UEs use an arbitration scheme to enable reception of frames, such as back-off collision avoidance. Additionally, the identity of a UE is typically incorporated into the transmission.

It is realized herein that systems using blind detection generally cannot use HARQ. HARQ protocols use a notion of transactions, where a transmission of a single frame corresponds to a transaction. A frame is a set of bits arranged for transmission. The frame can contain a variety of fields, including a data field, a header field, a pilot field, a cyclic redundancy check (CRC), and others. In HARQ systems, a UE re-transmits a frame until it is acknowledged, enabling efficient operation of upper layers of the systems. A first transmission and a re-transmission can be combined when they are linked as a single transaction, which is identified by a frame sequence number. For example, in long term evolution (LTE) systems, the frame sequence number is a combination of a UE identifier (ID) and a HARQ process ID, which is implied according to timing of transmissions. It is realized herein that even when the origin UE is known, the receiver cannot combine and decode an encoded frame with future frames without knowing the sequence number of the frame being decoded. Consequently, it is realized herein, HARQ requires some form of frame identification.

In a HARQ system, if the first transmission is not decoded, the receiver does not know the sequence number of the frame being decoded. HARQ systems using hard resource assignment generally use stop-and-wait HARQ, where a transmitter transmits a frame and waits for an acknowledgment. In these systems, HARQ processes can be carried out without explicit frame identification, because there is only one frame transaction handled by the HARQ process. In these systems, the frame identification is implicitly known from the resources used in the transmission, or is implied by the fact that there is only one frame transmitted at a time. In HARQ systems using soft resource assignment, HARQ processes can be carried out once the origin UE and frame sequence number are identified, which typically requires full decoding of the second transmission, or some additional signaling.

In systems with blind detection, the receiver blindly detects each possible UE until it finds the transmitter, or origin UE, and decodes the frame sequence number. When the first transmission is not decoded successfully, the receiver is unable to combine it with a re-transmission or other future frames without additional information, such as the origin UE of the first transmission and the frame sequence number of the first transmission. It is realized herein that HARQ is possible in blind detection systems when re-transmissions include information about the first transmission that allows the first transmission and the re-transmission to be linked into a single transaction.

FIG. 1 is a block diagram of one embodiment of a NIC too. NIC 100 includes a memory 110, a memory 130, a transmitter 140, an encoder 150, and a processor 160, all coupled to a bus 170. In certain embodiments, memory 110 and memory 130 can be separate portions of a single memory device. In alternative embodiments, memory 110 and memory 130 are separate memory devices. Bus 170 can be a parallel bus, such as peripheral component interconnect (PCI) and small computer system interface (SCSI), among others. In other embodiments, bus 170 is a serial bus, such as serial advanced technology attachment (SATA) and universal serial bus (USB), among others. Bus 170 allows communication among memory 110, memory 130, transmitter 140, encoder 150, and processor 160.

Encoder 150 is operable to receive bits of data as input and encodes those bits for transmission. Memory 130 is configured to store encoded data bits 132. Encoded data bits 132 are generated as an output from encoder 150 and are written to memory 130 via bus 170. Processor 160 is configured to access encoded data bits 132 in memory 130 via bus 170 and prepare them for transmission through transmitter 140. Transmitter 140 serves as an interface for NIC too to a channel. Transmitter 140 is operable to receive a frame for transmission over bus 170 and transmit the frame using an assigned RU.

Memory 110 is configured to store a HARQ frame data structure 120 that includes a header 122, a header CRC 124, a data field 126, and a data CRC 128. Memory 110 can be a variety of types of storage, including random access memory (RAM) such as dynamic RAM (DRAM) and static RAM (SRAM). Memory 110 can also be other forms of storage, such as flash memory.

Processor 160 is configured to carry out a HARQ process for the channel and the assigned RU. Within that process, processor 160 accesses encoded data bits 132 in memory 130 via bus 170 and causes a set of encoded data bits to be written to data field 126 in HARQ frame data structure 120. Processor 160 then computes a CRC for the set of encoded data bits and writes it to data CRC 128 in HARQ frame data structure 120 via bus 170. Processor 160 causes a first transmission of a frame through transmitter 140 toward a blind detection receiver. The frame in the first transmission contains bits from data field 126 and data CRC 128 in HARQ frame data structure 120. The first transmission is either acknowledged by the blind detection receiver, or it is not. If acknowledged, the process repeats for a new set of encoded data bits from encoded data bits 132 in memory 130. If not acknowledged, processor 160 determines, by the HARQ process, if a second transmission, or re-transmission, should be made. In certain embodiments, the determination is made according to a time lapse since the first transmission. Processor 160 can include a timer that is started upon the first transmission and expires at a duration set according to the HARQ process.

Upon expiration of the timer, processor 160 determines a second transmission is necessary. In certain embodiments, processor 160 includes the same set of encoded data bits in data field 126 as in the first frame. In other embodiments, processor 160 includes a portion of the set of encoded bits in the first frame in the second frame. The selection of bits for re-transmission can, in certain embodiments, include bit puncturing, so long as both the transmitter and receiver have knowledge of the corresponding puncturing rules. In the embodiment of FIG. 1, processor 160 generates a header that includes information about the first frame and causes that information to be written to header 122 in HARQ frame data structure 120 via bus 170. The information about the first frame can include a variety of properties that identify the first frame, including the RU used, time or frequency resources used, modulation and coding of the first frame, and the frame sequence number. In certain embodiments, the HARQ frame data structure also includes a pilot sequence that is appended to the first frame. In these embodiments, the information about the first frame can include an identifier of the pilot sequence included in the first frame. The pilot sequence is physical layer symbol known by the transmitter and receiver to identify a particular UE or transmission. The pilot sequence can be, for example, a point in a quadrature amplitude modulation (QAM) constellation, or a specific time signal.

Processor 160 is configured to compute a CRC for the header and the encoded bits of data in data field 126. The CRC can be one CRC shared by the header and encoded bits of data, or can be separate CRCs, a header CRC stored in header CRC 124 and a data CRC stored in data CRC 128. In certain embodiments, the CRC for the encoded bits of data is computed over the bits of all previous transmissions in the transaction, which includes the set of encoded data bits and, in certain embodiments, any header appended to the first frame. Processor 160 causes header 122 to be modulated and coded for transmission through transmitter 140. Modulation can include spreading in addition to any other baseband modulation technique, such as orthogonal frequency division multiplexing (OFDM) and single-carrier modulation. In some embodiments, the modulation and coding for header 122 is different from modulation and coding applied to the first frame. In some embodiments, the modulation and coding for header 122 is different from the modulation and coding applied to data field 126. Processor 160 then causes a second frame containing header 122, header CRC 124, data field 126, and data CRC 128 to be passed to transmitter 140 through bus 170. Transmitter 140 then transmits the second frame toward the blind detection receiver.

Figure 2:
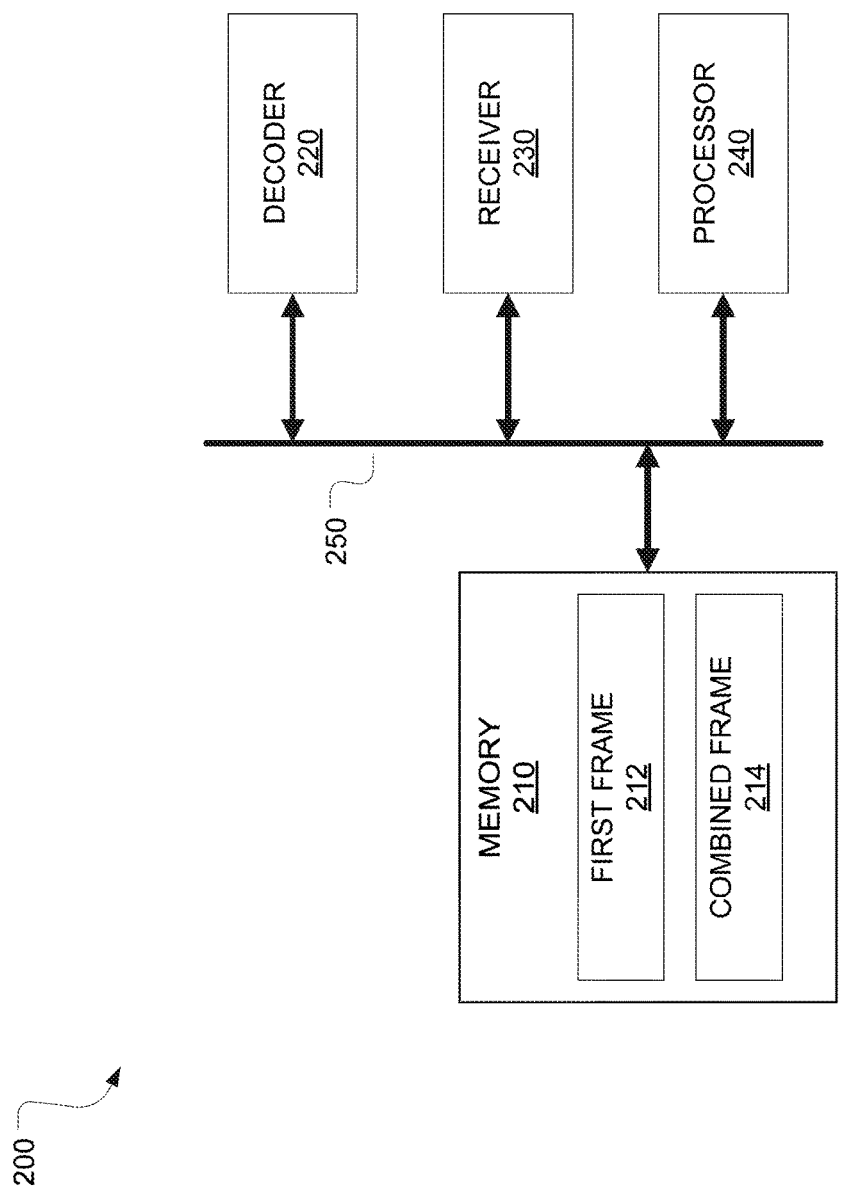
FIG. 2 is a block diagram of another embodiment of a NIC.

FIG. 2 is a block diagram of another embodiment of a NIC 200. NIC 200 includes a memory 210, a decoder 220, a receiver 230, and a processor 240, all coupled to a bus 250. Bus 250 can be a parallel bus, such as peripheral component interconnect (PCI) and small computer system interface (SCSI), among others. In other embodiments, bus 250 is a serial bus, such as serial advanced technology attachment (SATA) and universal serial bus (USB), among others. Bus 250 allows communication among memory 210, decoder 220, receiver 230, and processor 240.

Receiver 230 serves as an interface for NIC 200 to a channel over which a first transmission is detected using blind detection. The first transmission includes a first frame containing encoded bits of data and a CRC. Decoder 220 attempts to decode the first frame. If decoder 220 is successful, the CRC in the first frame will check out, in which case processor 240 causes an acknowledgment to be transmitted back to the origin UE. If decoder 220 is unsuccessful, the CRC does not pass and processor 240 causes the first frame to be written to memory 210. Memory 210 is configured to store a first frame 212 and a combined frame 214. The first frame is written to first frame 212 through bus 250. First frame 212 and combined frame 214, in certain embodiments, are indexed according to the origin UE. NIC 200 then waits for a second transmission containing a second frame. Receiver 230 detects the second transmission that includes the second frame using blind detection. The second frame contains a header, at least a portion of the encoded bits of data from the first frame, and at least one CRC for the header and data. In certain embodiments, the second frame includes a separate CRC for the header and the encoded bits of data. In other embodiments, a single CRC is shared by the header and the encoded bits of data. In embodiments where the second frame originates from the origin UE and the origin UE is known by NIC 200, processor 240 accesses first frame 212 in memory 210 through bus 250 and combines the first frame and the second frame into a combined frame. Processor 240 then causes the combined frame to be written to combined frame 214 in memory 210 via bus 250. Decoder 220 then accesses combined frame 214 and attempts to decode the combined frame. Once again, the CRC for the combined frame is checked and, if it passes, the frame is acknowledged.

If the origin UE of the second frame is unknown, decoder 220 attempts to decode the header, followed by a checking of a header CRC. If the header CRC does not pass, the second frame is treated as part of a separate transaction than the first frame. This treatment can lead to the second frame being decoded successfully by decoder 220 or being stored in memory 210 if decoder 220 fails to decode the second frame successfully. When the header CRC does pass, the UE ID and frame identification are retrieved from the header. UE ID can be ascertained by determining the RU used for the second frame, or in certain embodiments, by checking the UE ID embedded in the CRC. The frame identification is by information in the header about the first frame. Information about the first frame can include the RU used for the first frame, identification of a pilot sequence included in the first frame, coding and modulation used in the first frame, or the frame sequence number of the first frame. The frame identification allows processor 240 to associate, or link, the first frame and the second frame into a single transaction. Processor 240 is operable to combine the first frame and the second frame into a combined frame that can be written to combined frame 214. The combined frame can then be decoded by decoder 220. If decoder 220 successfully decodes the combined frame and the CRC for the combined frame passes, processor 240 causes an acknowledgment of the frame to be transmitted.

Figure 3:
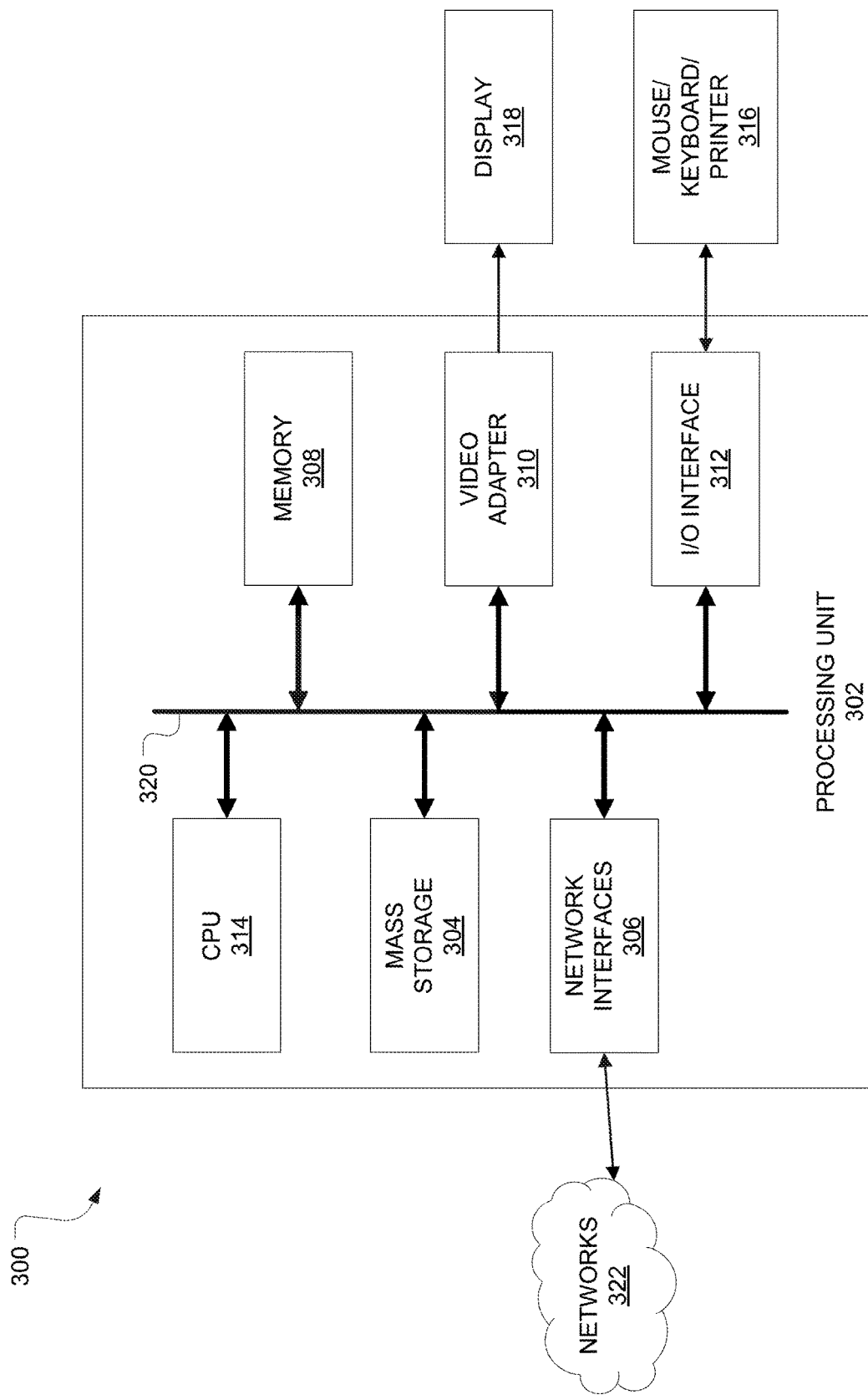
FIG. 3 is a block diagram of one embodiment of a computing system.

FIG. 3 is a block diagram of a processing system 300 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 300 may comprise a processing unit 302 equipped with one or more input/output devices, such as a speaker, microphone, mouse, touchscreen, keypad, keyboard, printer, display, and the like. The processing unit may include a central processing unit (CPU) 314, memory 308, a mass storage device 304, a video adapter 310, and an I/O interface 312 connected to a bus 320.

The bus 320 may be one or more of any type of several bus architectures including a memory bus or memory controller, a peripheral bus, video bus, or the like. The CPU 314 may comprise any type of electronic data processor. The memory 308 may comprise any type of system memory such as static random access memory (SRAM), dynamic random access memory (DRAM), synchronous DRAM (SDRAM), read-only memory (ROM), a combination thereof, or the like. In an embodiment, the memory 308 may include ROM for use at boot-up, and DRAM for program and data storage for use while executing programs.

The mass storage 304 may comprise any type of storage device configured to store data, programs, and other information and to make the data, programs, and other information accessible via the bus 320. The mass storage 304 may comprise, for example, one or more of a solid state drive, hard disk drive, a magnetic disk drive, an optical disk drive, or the like.

The video adapter 310 and the I/O interface 312 provide interfaces to couple external input and output devices to the processing unit 302. As illustrated, examples of input and output devices include a display 318 coupled to the video adapter 310 and a mouse/keyboard/printer 316 coupled to the I/O interface 312. Other devices may be coupled to the processing unit 302, and additional or fewer interface cards may be utilized. For example, a serial interface such as Universal Serial Bus (USB) (not shown) may be used to provide an interface for a printer.

The processing unit 302 also includes one or more network interfaces 306, which may comprise wired links, such as an Ethernet cable or the like, and/or wireless links to access nodes or different networks. The network interfaces 306 allow the processing unit 302 to communicate with remote units via the networks. For example, the network interfaces 306 may provide wireless communication via one or more transmitters/transmit antennas and one or more receivers/receive antennas. In an embodiment, the processing unit 302 is coupled to a local-area network 322 or a wide-area network for data processing and communications with remote devices, such as other processing units, the Internet, remote storage facilities, or the like.

Figure 4:
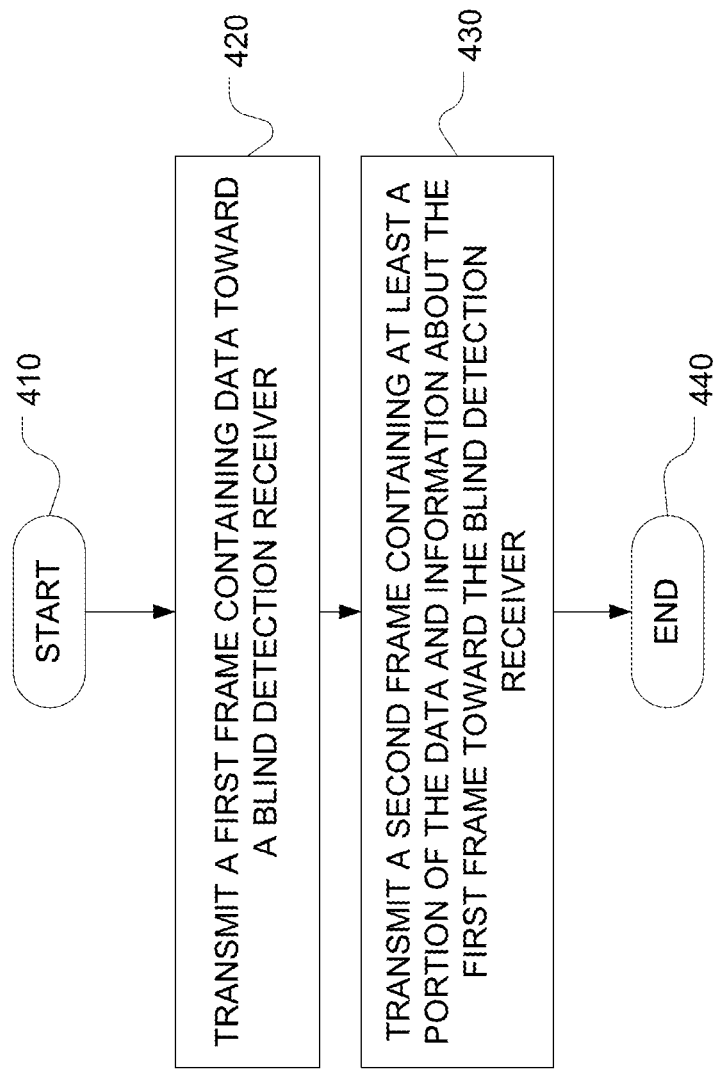
FIG. 4 is a flow diagram of one embodiment of a method of transmitting using HARQ.

FIG. 4 is a flow diagram of one embodiment of a method of transmitting using HARQ. The method begins at a start step 410. At a first transmitting step 420, a first frame is transmitted toward a blind detection receiver. The first frame contains encoded bits of data and a CRC for the data. In certain embodiments, the first frame lacks a header that could otherwise be used to identify an origin UE or the RU used for the transmission. At a later time, at a second transmitting step 430, a second frame is transmitted toward the blind detection receiver. In certain embodiments the second transmitting is triggered by an expiration of a timer that starts upon first transmitting step 420. The timer is either reset according to receipt of an acknowledgment for the first transmission or it expires, causing the second transmission. A receiver may provide positive or negative acknowledgments for RUs. A receiver may also provide positive acknowledgment for a frame. An origin UE typically relies on lapsed time to detect a lost or non-acknowledgment for the frame.

The second frame contains at least a portion of the encoded bits of data contained in the first frame. In certain embodiments, all encoded bits of data contained in the first frame are included in the second frame. In other embodiments, only a portion of the encoded bits of data from the first frame are included in the second. The second frame also contains a header that includes information about the first frame. The information about the first frame can be used to associate the first and second frames and link them into a single transaction. Information about the first frame can include the RU used in the first transmission, the frame sequence number of the first frame, an identifier of a pilot sequence included in the first frame, and the modulation and coding used for the first frame.

In certain embodiments, the modulation and coding used in the first frame can differ from that used for the header of the second frame. Furthermore, in certain embodiments, the modulation and coding used for the header of the second frame can differ from that used for the encoded bits of data in the second frame.

The second frame, in certain embodiments, can also include at least one CRC. In some embodiments, a single CRC is computed for both the encoded bits of data and the header. In other embodiments, a header CRC is computed for the header and a separate data CRC is computed for the encoded bits of data.

When the first frame and the second frame are linked in the same transaction, the first frame and the second frame can be combined into a combined frame for decoding. The method then ends at a step 440.

Figure 5:
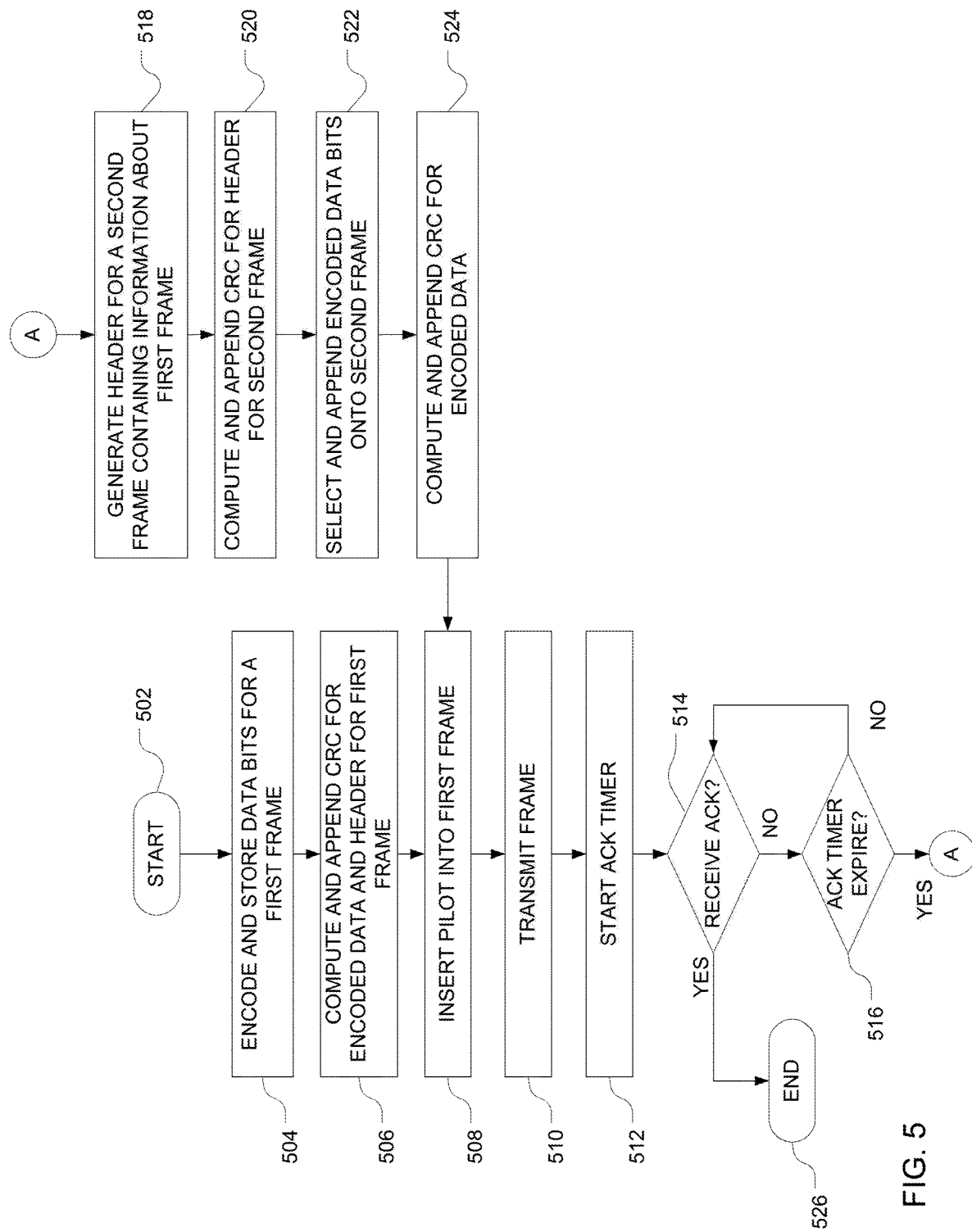
FIG. 5 is a flow diagram of another embodiment of a method of transmitting using HARQ.

FIG. 5 is a flow diagram of another embodiment of a method of transmitting using HARQ. The method begins at a start step 502. At an encoding step 504, data bits are encoded and stored for a first frame. A CRC for the encoded data and header are then computed and appended to the first frame at a step 506. A pilot is then inserted into the first frame at a pilot insertion step 508. The first frame is then transmitted toward a blind detection receiver at a transmitting step 510. Upon transmission, an acknowledge timer is started at a timer starting step 512.

The UE then waits for an acknowledgment from the blind detection receiver. At an acknowledgment check step 514, the UE checks whether an acknowledgment has been received. If so, the method ends at an end step 526. Alternatively, the method could repeat, beginning with the receipt of new data for transmission. If no acknowledgment has been received at acknowledgment check step 514, the acknowledgment timer is checked for expiration at expiration check step 516. If the acknowledgment timer has not expired, the UE continues waiting for an acknowledgment and returns to acknowledgment check step 514. If the acknowledgment timer has expired, the UE proceeds to a header generation step 518. At header generation step 518, a header is generated for a second frame. The header contains information about the first frame, which can include the RU used for the first frame, the coding and modulation used for the first frame, the frame sequence number of the first frame, and, in embodiments where a pilot sequence is included in the first frame, an identifier of the pilot sequence included in the first frame. In certain embodiments using hard resource assignments, only a pilot identifier may be inserted in the header, which would be sufficient information to identify the UE in the second transmission. This identification uniquely identifies the previous RUs used by the UE.

At a second frame header CRC computation step 520, a CRC is computed for the header and appended to the second frame. Encoded data bits for the second frame are then selected and appended to the second frame at an encoded data selection step 522. Then a CRC for the encoded data is computed and appended to the second frame at a second frame encoded data CRC computation step 524.

Once the second frame is otherwise assembled, the method returns to pilot insertion step 508. The method also continues to transmission step 510 to transmit the second frame and again starts the acknowledgment timer at timer starting step 512. Again, the UE waits for acknowledgment. The blind detection receiver may combine the first frame and the second frame, decode the combined frame, and send an acknowledgment to the UE, in which case the method would end at end step 526. Alternatively, the blind detection receiver may fail to receive either of the first frame and the second frame, or may fail to decode the combined frame. In this case, when the acknowledgment timer expires, another frame would be generated and transmitted toward the blind detection receiver.

Figure 6:
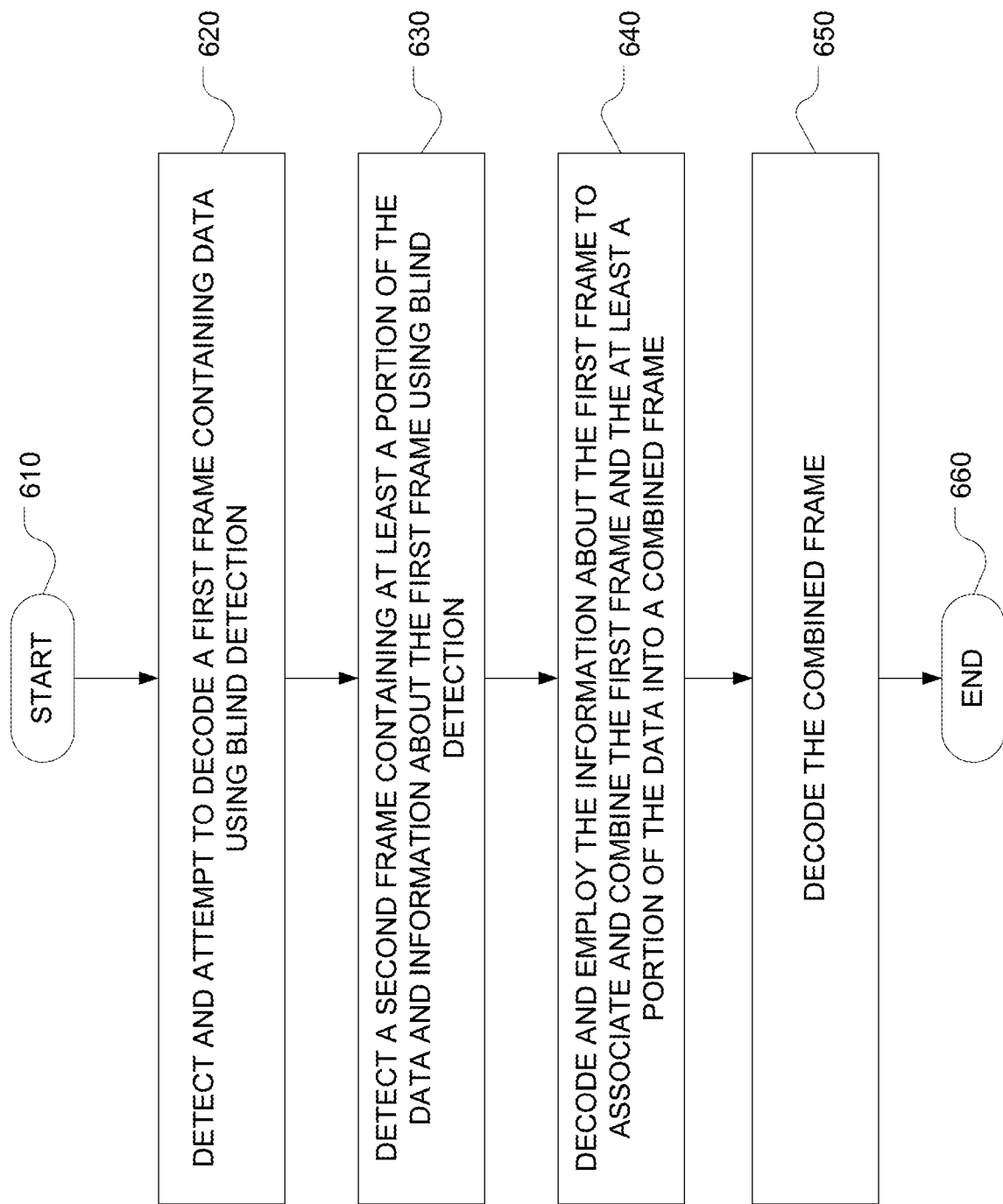
FIG. 6 is a flow diagram of one embodiment of a method of receiving using HARQ and blind detection.

FIG. 6 is a flow diagram of one embodiment of a method of receiving using HARQ and blind detection. The method begins at a start step 610. At a first frame detection step 620, a first frame is detected using blind detection and an attempt at decoding is made. The first frame contains encoded bits of data along with a CRC for the encoded bits. In some embodiments, the method also includes determining an origin UE for the first frame. The attempt at decoding the first frame fails. In certain embodiments, the first frame is then stored in memory and indexed according to the origin UE.

At a second frame detection step 630, a second frame is detected using blind detection. The second frame contains at least a portion of the encoded bits of data contained in the first frame, along with information about the first frame. The encoded bits of data are contained in a data field of the second frame. The information about the first frame is contained in a header. The information about the first frame can include the RU used for the first frame, the modulation and coding used for the first frame, and the frame sequence number of the first frame. In certain embodiments, the first frame includes a pilot sequence. In those embodiments, the information about the first frame can include an identifier of the pilot sequence included in the first frame. In certain embodiments using hard resource assignment, a UE ID is sufficient information to identify the UE in the second transmission and uniquely identifies the previous RUs used by the UE.

At least one CRC is included in the second frame. A single CRC can be computed for the header and encoded bits of data. Alternatively, one CRC can be computed for the header of the second frame, and another CRC computed for the encoded bits of data.

At a decoding step 640, the information about the first frame is decoded and employed to associate the first frame and the second frame. The information about the first frame is also employed to combine the first frame and the at least a portion of the encoded bits of data contained in the first frame, forming a combined frame. The combined frame is then decoded at a second decoding step 650. If the second decoding of the combined frame is successful, in certain embodiments, an acknowledgment is sent toward the origin UE. Otherwise, in certain embodiments, when the second decoding step 650 fails, the method proceeds to attempting to decode for all possible origin UEs. The method then ends at an end step 660.

Figure 7:
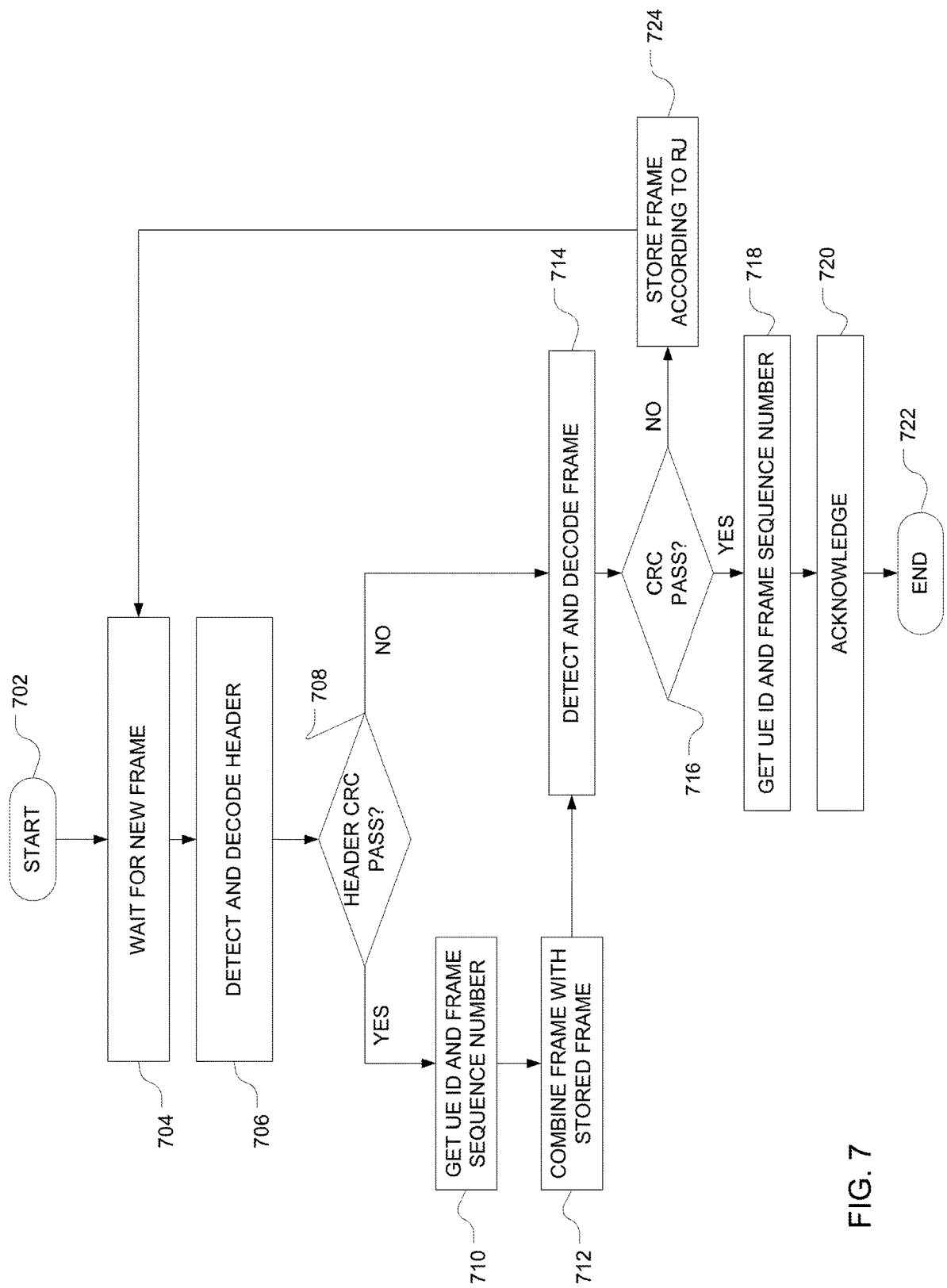
FIG. 7 is a flow diagram of another embodiment of a method of receiving using HARQ and blind detection.

FIG. 7 is a flow diagram of another embodiment of a method of receiving using HARQ and blind detection. This embodiment of the method can be used in HARQ systems using soft resource allocations. The method begins at a start step 702. At a waiting step 704, a blind detection receiver waits for a new frame. When a new frame arrives, the header of the new frame is detected and decoded at detect and decode step 706. The CRC for the header is then checked at a header CRC checking step 708.

The header CRC either passes or it does not. If the header CRC does not pass, the frame is treated as a first frame in a transaction. The first frame is detected and decoded at a frame detection and decoding step 714. The first frame includes encoded bits of data and a CRC for the encoded bits of data. The CRC is checked at a data CRC checking step 716. If the CRC does not pass, the first frame is stored, at a storing step 724, according to the RU used in the first transmission. The blind detection receiver then returns to waiting step 704 to wait for another frame. If at data CRC checking step 716 the CRC passes, the UE ID for the origin UE is retrieved from the frame along with the frame sequence number at retrieval step 718. The receipt is then acknowledged at acknowledge step 720. The method then ends at end step 722. Alternatively, the method can return to waiting step 704 and wait for a new frame.

If the header CRC passes at header checking step 708, then the frame is treated as a re-transmission of the first frame. The UE ID of the origin UE for the first frame and the frame sequence number of the first frame are retrieved from the decoded header at header retrieval step 710. The information about the first frame in the header allows the first frame and the second frame to be linked into a single transaction. At a combining step 712, the first frame and the second frame are combined. The method then proceeds to frame detection and decoding step 714. Decoding is attempted as it was for the first frame. If decoding is successful and the CRC passes at data CRC checking step 716, the UE ID of the origin UE and the frame sequence number are retrieved at retrieval step 718 and an acknowledgment is sent at acknowledge step 720.

Figure 8:
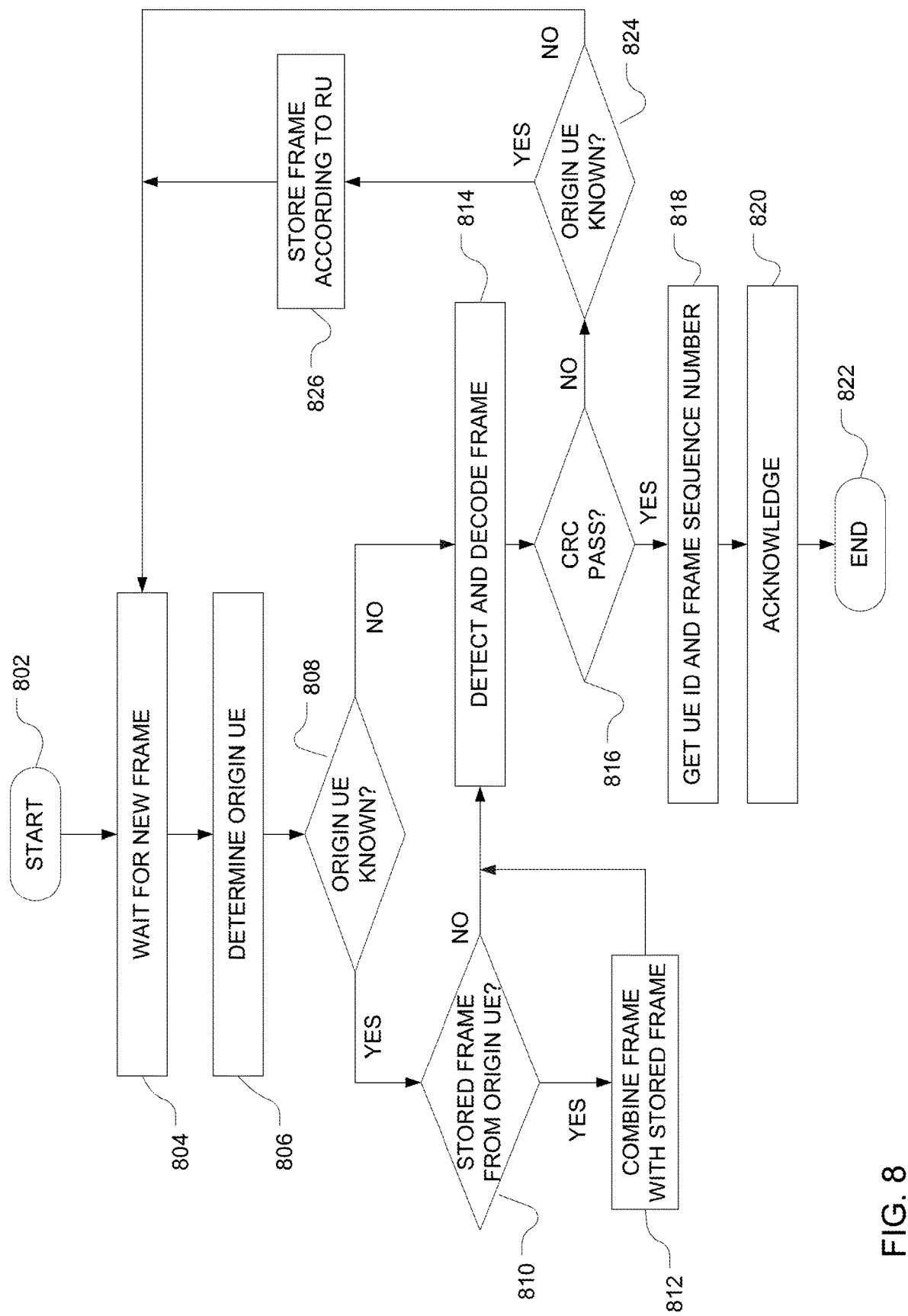
FIG. 8 is a flow diagram of yet another embodiment of a method of receiving using HARQ and blind detection.

FIG. 8 is a flow diagram of yet another embodiment of a method of receiving using HARQ and blind detection. This embodiment of the method can be used in HARQ systems using hard resource allocations. The method begins at a start step 802. At a waiting step 804, a blind detection receiver waits for a new frame. When a new frame arrives at the blind detection receiver, the origin UE is determined at a determination step 806. At a checking step 808, the origin UE is checked to determine if it is known to the blind detection receiver. When the origin UE is known, the blind detection receiver checks if there is a stored frame from the origin UE at a checking step 810. If there is a stored frame, it is combined with the new frame at a combining step 812. The combined frame is then detected and decoded at a detect and decode step 814. If there is no stored frame from the origin UE, then the new frame passes on to detect and decode step 814. Alternatively, if the origin UE of the new frame is unknown, the new frame also moves on to detect and decode step 814.

At detect and decode step 814, an attempt is made to detect and decode either the new frame or a combined frame from combining step 812. At a checking step 816, the CRC for the decoded frame is checked. If detect and decode step 814 was successful and the CRC passes at checking step 816, the method continues to a retrieval step 818. At retrieval step 818, the UE ID and frame sequence number are retrieved from the decoded frame. The decoded frame is then acknowledged at an acknowledgment step 820. The method then ends at an end step 822.

When detect and decode step 814 fails and the CRC does not pass at checking step 816, the frame cannot be decoded and should not be acknowledged. The blind detection receiver checks if the origin UE is known at a checking step 824. If the origin UE is known, the frame is stored according to the RU used in its transmission at a storing step 826. If the frame that failed to decode is the new frame, the new frame is stored alone. If the frame that failed to decode is the combined frame from combining step 812, the combined frame is stored. In alternative embodiments, the blind detection receiver stores the originally stored frame and the new frame, but not the combined frame. The method then returns to waiting for a new frame at waiting step 804. When CRC does not pass at checking step 816 and the origin UE of the new frame is unknown, the frame is not stored and the method returns directly to waiting for a new frame at waiting step 804. The blind detection receiver continues to attempt to combine stored frames with new frames until a successful decoding is achieved.

Figure 9:
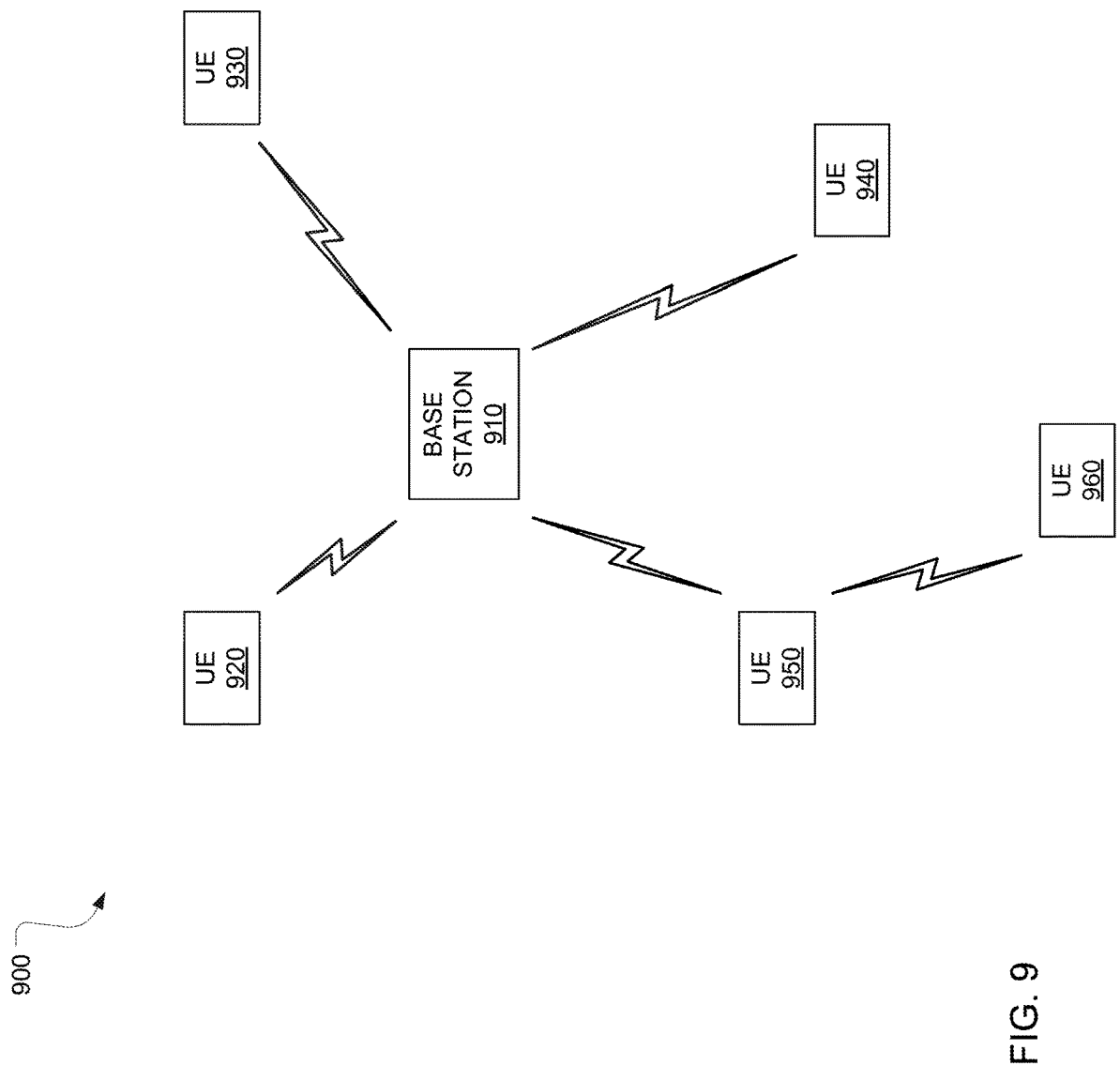
FIG. 9 is a block diagram of one embodiment of a wireless communication system.

FIG. 9 is a block diagram of one embodiment of a wireless communication system 900. Wireless communication system 900 includes a base station 910 that serves one or more UEs, such as UE 920, UE 930, UE 940, and UE 950, by receiving communications originating from the UEs and forwarding the communications to their respective intended destinations, or by receiving communications destined for the UEs and forwarding the communications to their respective intended UEs. Some UEs can communicate directly with one another as opposed to communicating through base station 910. For example, in the embodiment of FIG. 9, a UE 960 transmits directly to UE 950, and vice versa. Base station 910 is sometimes referred to as an access point, a NodeB, an evolved NodeB (eNB), a controller, or a communication controller. UEs 920 through 960 are sometimes referred to as stations, mobile stations, mobiles, terminals, users, or subscribers.

HARQ processes are carried out for the respective communication channels between UEs 920 through 960 and base station 910. Additionally, UEs 920 through 960 can employ a blind detection receiver in receiving communications from another UE or base station 910. For example, base station 910 can include a NIC, such as the NIC embodiment of FIG. 2, having a blind detection receiver and UE 920 can include a NIC, such as the NIC embodiment of FIG. 1, configured to carry out HARQ processes in communicating to base station 910. Likewise, the NIC in UE 920 can be further configured to employ blind detection in receiving communications from base station 910 or any of UEs 930 through 960, similar to the embodiment NIC of FIG. 2. The NIC in base station 910 can be further configured to carry out HARQ processes in communicating with UEs 920 through 960, similar to the embodiment NIC of FIG. 1.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wireless communication, comprising:
   transmitting a first frame containing first data to a receiver; and
   transmitting a second frame, the second frame containing at least a portion of the first data, the transmitting of the second frame being caused by receipt of a negative acknowledgement for the first frame before a timer expires.

2. The method of claim 1, further comprising:
   starting the timer upon transmission of the first frame.

3. The method of claim 1, wherein the first frame has a first modulation and coding, and a header of the second frame has a second modulation and coding different from the first modulation and coding.

4. The method of claim 3, wherein a data field of the second frame has a third modulation and coding different from the second modulation and coding.

5. The method of claim 1, wherein the second frame includes information that identifies the first frame.

6. The method of claim 5, wherein the information that identifies the first frame includes an identifier of a pilot sequence included in the first frame.

7. The method of claim 1, wherein the second frame includes a cyclic redundancy check (CRC).

8. The method of claim 7, wherein the CRC includes a single CRC for a header and a data portion of the second frame.

9. The method of claim 7, wherein the CRC includes a first CRC for a header of the second frame and a second CRC for a data portion of the second frame.

10. A wireless device comprising:
    a transmitter; and
    a processor configured to:
       transmit a first frame containing first data to a receiver; and
       transmit a second frame, the second frame containing at least a portion of the first data, the transmitting of the second frame being caused by receipt of a negative acknowledgement for the first frame before a timer expires.

11. The wireless device of claim 10, the processor further configured to:
    start the timer upon transmission of the first frame.

12. The wireless device of claim 10, wherein the first frame has a first modulation and coding, and a header of the second frame has a second modulation and coding different from the first modulation and coding.

13. The wireless device of claim 12, wherein a data field of the second frame has a third modulation and coding different from the second modulation and coding.

14. The wireless device of claim 10, wherein the second frame includes information that identifies the first frame.

15. The wireless device of claim 14, wherein the information that identifies the first frame includes an identifier of a pilot sequence included in the first frame.

16. The wireless device of claim 10, wherein the second frame includes a cyclic redundancy check (CRC).

17. The wireless device of claim 16, wherein the CRC includes a single CRC for a header and a data portion of the second frame.

18. The wireless device of claim 16, wherein the CRC includes a first CRC for a header of the second frame and a second CRC for a data portion of the second frame.

19. A non-transitory computer-readable medium having instructions stored thereon that, when executed by a wireless device, cause the wireless device to perform operations, the operations comprising:
    transmitting a first frame containing first data to a receiver; and
    transmitting a second frame, the second frame containing at least a portion of the first data, the transmitting of the second frame being caused by receipt of a negative acknowledgement for the first frame before a timer expires.

20. The non-transitory computer-readable medium of claim 19, the operations further comprising:
    starting the timer upon transmission of the first frame.

* * * * *